Aug. 22, 1972 J. H. BALTHIS, JR 3,686,031
METAL PHOSPHATE COATED FERROMAGNETIC CHROMIUM OXIDE AND ITS PREPARATION
Filed Nov. 26, 1969
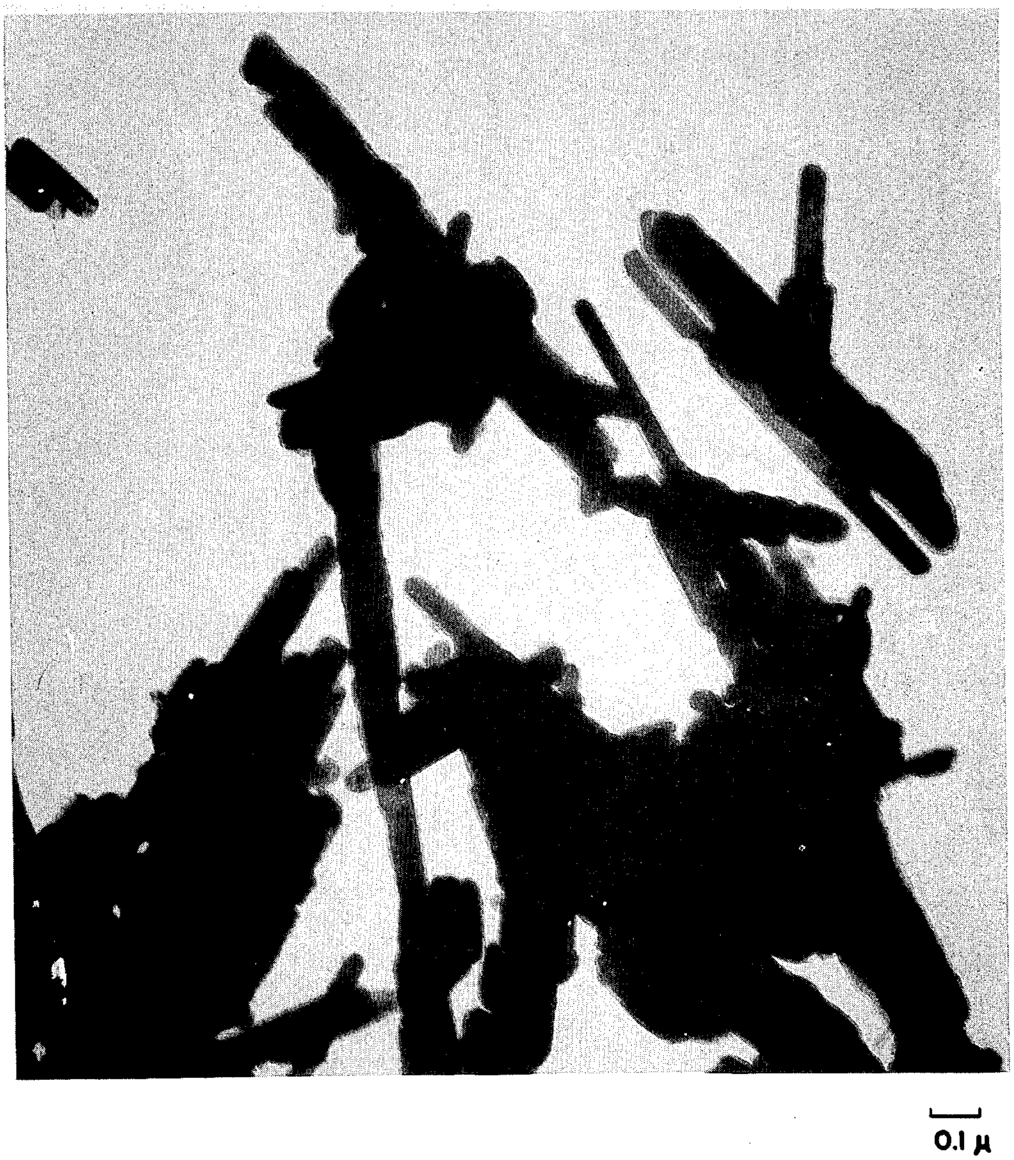
INVENTOR
JOSEPH H. BALTHIS
BY [signature]
ATTORNEY United States Patent Office 3,686,031
Patented Aug. 22, 1972

3,686,031
METAL PHOSPHATE COATED FERROMAGNETIC CHROMIUM OXIDE AND ITS PREPARATION

Joseph H. Balthis, Jr., Mendenhall, Pa., assignor to E. I. du Pont de Nemours and Company, Wilmington, Del.
Filed Nov. 26, 1969, Ser. No. 880,299
Int. Cl. C04b *35/100;* C01g *37/02;* C23c *1/10*
U.S. Cl. 117—234 26 Claims

ABSTRACT OF THE DISCLOSURE

Ferromagnetic composition of improved stability comprising a ferromagnetic chromium oxide substrate coated with a metal phosphate such as aluminum phosphate. Preparation of the above composition by slurrying ferromagnetic chromium oxide particles in water and precipitating the metal phosphate by adding to the slurry at a temperature of 0° C.–100° C. and at a pH of 2.2–7.0 soluble phosphates or acids of pentavalent phosphorus and soluble trivalent aluminum, tetravalent zirconium and titanium, and divalent lead salts or metal aluminates or plumbites.

BACKGROUND OF THE INVENTION

Field of the invention

This invention is related to metal phosphate coated ferromagnetic chromium oxide compositions of improved stability.

Description of the prior art

Ferromagnetic chromium oxide is a crystalline magnetic material which, under some conditions, particularly in the presence of moisture, may react with oxidizable organic and inorganic substances with formation of nonmagnetic, lower valent chromium compounds. Ferromagnetic chromium oxide slowly disproportionates in water at a rate dependent upon temperature, forming nonmagnetic $CrO(OH)$ and $CrO_3$. Any loss of magnetic material (degradation) may be detrimental in use applications, e.g., when chromium oxide is the magnetic component of recording tape.

Methods of providing protective coatings without reducing the surface of ferromagnetic chromium oxide have not been disclosed heretofore. Stabilization without an adverse effect on the magnetic properties of ferromagnetic chromium oxide obviously offers advantages in use applications which rely on the magnetic properties of the oxide.

SUMMARY OF THE INVENTION

According to the present invention there is provided a ferromagnetic chromium oxide stabilized by a coating containing an effective stabilizing amount of at least one inorganic metal phosphate elected from the group consisting of aluminum phosphate, zirconium phosphate, titanium phosphate and lead phosphate, said coating being present in an amount of about 1%–20% by weight of the ferromagnetic chromium oxide. Since magnetic particles are present in close proximity to each other in magnetic tapes, it is preferred to use as thin a coating as consistent with the desired degree of stabilization. Considerably less than 20% by weight coating may result in significant stabilization.

According to the present invention there is further provided a process for the preparation of metal phosphate coated ferromagnetic chromium oxide consisting essentially of (1) slurrying ferromagnetic chromium oxide particles in water, (2) precipitating the metal phosphate by adding at about 0° C.–100° C. under agitation.

(A) at least one reactant selected from the group consisting of soluble phosphate salts, and soluble acids of pentavalent phosphorus, and (B) at least one reactant selected from the group consisting of soluble trivalent aluminum salts, tetravalent zirconium salts, tetravalent titanium salts, divalent lead salts, metal aluminates, or metal plumbites, and (3) controlling the pH of the slurry during the precipitation between about 2.2 and 7.0.

Optionally, one or more of reactants (A) or (B) may already be present during the slurrying of the ferromagnetic chromium oxide particles.

The coated product can be isolated by the usual means, e.g., filtering, after which it can be dried in vacuo or in air at about 0–80° C. or at any temperature up to 150° C. If water removal is sufficiently rapid to prevent excessive hydrolysis, and/or by heating in air or under equally strong oxidizing conditions at about 150–425° C. where any reduced oxide is reconverted to chromium(IV) oxide.

By an "effective stabilizing amount" is meant an amount of metal phosphate in the coating which is sufficient to reduce the rate of loss in magnetic properties per unit weight of the ferromagnetic chromium oxide in water and/or in organic media.

The use of the "consisting essentially of," in the above context does not exclude unspecified conditions or materials which do not prevent the advantages of the present invention from being realized.

The term "phosphates" in the context of the present invention includes orthophosphates, pyrophosphates, metaphosphates and hexametaphosphates.

The adjective "soluble" as it relates to the reactants of the present invention, means that they are soluble in the slurrying medium and/or that they can be introduced into that medium as a solution.

DESCRIPTION OF THE PREFERRED EMBODIMENTS

The present invention concerns the stabilization of ferromagnetic chromium oxide by coating the particles with a protective layer of metal phosphate(s). A key factor in obtaining such stabilization is the production of a thin, relatively impervious layer over substantially all of the surface of the ferromagnetic chromium oxide particles. If coating is incomplete, any uncoated portions of the surface remain exposed and available for chemical reaction. A second key factor is the resistance of the coating to fracture or attrition in the ultimate manipulation of the stabilized particles (e.g., grinding) into a form suitable for the planned use (e.g., as a highly dispersed phase for coating on a substrate to form a magnetic tape). If the coating is not resistant, any stabilization that has been achieved will be destroyed.

The method of carrying out this invention may be understood from the following descriptions of methods of coating ferromagnetic chromium oxide with aluminum phosphate. The amounts are in parts by weight and are based on 100 parts of ferromagnetic chromium oxide. When the term "phosphoric acid" is used without qualification, it refers to orthophosphoric acid, $H_3PO_4$.

(A)

A quantity of ferromagnetic chromium oxide, e.g. 100 parts, is slurried in about 250 to 5,000 parts of water. If the mode of precipitating the aluminum phosphate is by sequential introduction of reactants, 1 to 100 parts of 85 weight percent phosphoric acid, optionally diluted with 1–1,000 parts of water, is added during or after the slurrying operation. The slurry is placed in a suitably sized, water-jacketed reactor, and the temperature is adjusted to the desired value between 0 and 100° C.—preferably between 40 and 60° C. The slurry is stirred by an externally driven paddle stirrer at a speed sufficient to insure good mixing, and pH and temperature are monitored.

A quantity of an aqueous solution having 0.5 to 50 parts of aluminum in the form of sodium aluminate and 0 to 20 parts of alkali (e.g., sodium hydroxide) in 10 to 1,000 parts of water is added at a controlled rate. Addition is stopped when pH has risen to the desired value in the range 2.2 to 7— preferably to about 6. The required quantity of aluminum solution depends on the initial pH of the slurry, which may be 2 or less depending on the quantity of phosphoric acid used and on the alkali content of the sodium aluminate solution.

After precipitation is complete, the slurry is digested with continued stirring at the treatment temperature for about 5 to 60 minutes or longer to insure equilibration of the aluminum phosphate coating. The slurry is then cooled, and the oxide is separated from the mother liquor by filtering or other means and washed free of soluble by-products. The treated oxide is dried conveniently by displacing water with acetone followed by vacuum drying or in air at a temperature between 0 and about 80° C. The dry material may then be heat-treated by exposing it to air or oxygen at 150° C. to 425° C., preferably 250° C.–400° C., for 0.5 to 30 hours. Alternatively wet, filtered product may be dried and heat-treated simultaneously by exposure to air or oxygen at 150–425° C., preferably 250–400° C. for 0.5 to 30 hours.

(B)

The same general procedure and equipment described in A are used. To 100 parts of ferromagnetic chromium oxide slurried in 250 to 5,000 parts of water is added 0.5 to 40 parts of aluminum in the form of a soluble aluminum salt, e.g., $AlCl_3 \cdot 6H_2O$, preferably in 10 to 1,000 parts of water. The $Al^{3+}$ solution is added either during the slurrying step or thereafter. The mixture is heated to the desired temperature between 0 and 100° C. but preferably between 40 and 60° C., and addition of an aqueous solution containing 0.5 to 50 parts by weight of a soluble phosphate—for example $Na_3PO_4$—is begun.

The pH is monitored and maintained between 2.2 and about 7 until the phosphate addition is complete or the pH has reached about 7 but preferably 6. If a less alkaline phosphate (e.g., $Na_2HPO_4$, $NaH_2PO_4$ or $(NH_4)_2HPO_4$) is used, additional dilute (e.g., 0.05 to 5 molar) alkali (e.g. sodium hydroxide or ammonium hydroxide) is added, either simultaneously with the phosphate solution or after the phosphate addition is completed, at a rate and in an amount such that a pH between about 2.2 and 7, but preferably 6, is attained. After the precipitation is completed, the remaining steps of the process are as described above.

In the above procedures any soluble aluminate (e.g., sodium aluminate, potassium aluminate) and/or aluminum salt (e.g., aluminum nitrate, aluminum chloride, aluminum acetate, or aluminum sulfate) may be used. Any soluble orthophosphate salt (e.g., $Na_3PO_4$, $NaH_2PO_4$, $Na_2HPO_4$ or $(NH_4)_2HPO_4$) may be used in place of aqueous phosphoric acid combined with addition of appropriate aqueous acid (e.g., hydrochloric acid, nitric acid), or aqueous alkali (e.g., sodium hydroxide, ammonium hydroxide) to control the pH in the range of 2.2 to 7. The order of addition may be reversed.

(C)

In another way of forming a coating, the aluminum- and phosphate-containing solutions are added to the aqueous ferromagnetic chromium oxide slurry simultaneously. This has the advantage that the relative concentration of reactants can be easily varied and the ionic strength of the system can be minimized thus improving particle dispersion and resulting in products having better tape characteristics. Additionally, the pH of the system can be controlled either by the rate of addition or quantity of reactants or by the separate addition of acid or alkali.

It will be understood that during "simultaneous addition" any of the reactants may be in excess of the others and that the addition of any one of the reactants may be begun before the others.

Thus, if simultaneous addition of reactants is used, the aqueous ferromagnetic chromium oxide slurry (100 parts of ferromagnetic chromium oxide in about 250 to 5,000 parts of water) is placed in a reactor, preferably water-jacketed to control temperature, stirring is commenced, and the temperature is adjusted to between 0 and 100° C. but preferably between 40 and 60° C. Following initial pH adjustment of the ferromagnetic chromium oxide slurry with dilute aqueous acid such as nitric acid or hydrochloric acid or alkali such as sodium hydroxide to a value between 0.5 and 7 and preferably to a value between about 2.3 and 2.6, simultaneous addition of (1) 10 to 1,000 parts of an aqueous solution containing 1 to 100 parts of 85 weight percent phosphoric acid and (2) 10 to 1,000 parts of an aqueous solution containing 0.5 to 50 parts of aluminum in the form of sodium aluminate and 0 to 20 parts of alkali (e.g., sodium hydroxide) is begun.

During precipitation pH is preferably controlled between 2.3 and 2.6 until all of the phosphoric acid solution is added by adjusting its rate of addition relative to that of the sodium aluminate solution or alternatively by augmenting either acid addition by separate addition of dilute aqueous hydrochloric acid or nitric acid or alkali addition by the separate addition of dilute aqueous sodium hydroxide or other alkali. The pH is preferably allowed to rise to 6 by the end of the sodium aluminate addition. Final purification, drying and heat treating, if desired, is the same as described above.

(D)

The general procedure and equipment of C are used.

A slurry of 100 parts of ferromagnetic chromium oxide in 250 to 5,000 parts of water is placed in a water-jacketed reactor, stirring is commenced and the temperature adjusted to between 0 and 100° C. but preferably between 40 and 60° C. The pH is adjusted with dilute aqueous acid such as nitric acid or hydrochloric acid or alkali such as sodium hydroxide to a value between 0.5 and 7 and preferably to a value between 2.3 and 2.6, and the simultaneous addition of the following is begun: (1) 10 to 1,000 parts of an aqueous solution containing 0.5 to 50 parts of aluminum in the form of a soluble aluminum salt (e.g., $AlCl_3 \cdot 6H_2O$), (2) 10 to 1,000 parts of an aqueous solution containing 0.5 to 30 parts by weight of phosphate as a soluble phosphate (e.g., $Na_3PO_4$, $Na_2HPO_4$, $NaH_2PO_4$, $(NH_4)_2HPO_4$) and (3) dilute aqueous acid (e.g., 0.05 to 5 M hydrochloric acid or nitric acid) or dilute aqueous alkali (e.g., 0.05 to 5 M sodium hydroxide or ammonium hydroxide) at such rate that the pH is controlled between 2.2 and about 7. Preferably pH is controlled between 2.3 and 2.6 until the addition of the aluminum solution is completed and then allowed to rise to about 6 during the addition of the remainder (if any) of the phosphate solution and the necessary further amount of alkali. Final purification, dryin gand heat treating, if desired, are the same as previously described.

In the coating processes utilizing simultaneous addition of reactants, any soluble aluminate (e.g., sodium aluminate, potassium aluminate) and/or aluminum salt (e.g., aluminum nitrate, aluminum chloride, aluminum acetate, aluminum sulfate) may be used. Any soluble phosphate salt (e.g., $Na_3PO_4$, $NaH_2PO_4$, $Na_2HPO_4$ or $(NH_4)_2HPO_4$) may be used in place of aqueous phosphoric acid.

(E)

Although in the coating procedures of the present invention it is not imperative to predisperse the oxide, it is frequently advantageous to do so in order to break apart small agglomerates of particles. Any suitable method or combination of methods of applying high shearing stress may be used.

In preparing ferromagnetic chromium oxide for coating, and in coating it with, e.g. aluminum phosphate, additives to improve the degree of particle dispersion and to alter the surface of the oxide may be advantageously introduced during the slurrying operation. The process of carrying out such a treatment may be understood from the following wherein compositions are given in parts by weight and the procedure of shaking with sand is used as the slurrying method.

Thus, to a mixture of 100 parts of ferromagnetic chromium oxide in 200 to 5,000 parts of water there is added 0.5 to 15 parts of stannous chloride preferably dissolved in 5 to 200 parts of water containing 0.1 to 15 parts of about 36 weight percent hydrochloric acid to repress hydrolysis. The addition may be made at any time during the sand shaking but it is conveniently made at the beginning. The temperature may be varied widely but preferably is between 10 and 90° C. After the shaking period is completed, dispersed chromium oxide is separated from sand by filtering, e.g. through a 200-mesh screen, using additional water to dilute the mixture, if desired, to reduce viscosity.

In another method of altering the surface of the ferromagnetic chromium oxide, 5 to 75 parts of sodium bisulfite is added in place of the stannous chloride.

The quantity of reducing solution used in surface treatment is important since the extent of surface reduction increases as the quantity of reducing agent is raised provided all of the reducing agent is consumed. Separation of ferromagnetic chromium oxide from the mother liquor is unnecessary but may be carried out, if desired, by filtration and washing before or after separation of sand.

The combined effect of surface treatment and predispersion is significantly improved particle separation. This effect is still further enhanced when stannous chloride is used since insoluble tin compounds formed on the chromium oxide particles appear to assist in maintaining particle separation. Stannous ion is oxidized during this reaction. It is evident that the amount of tin in stannic form may be augmented by adding small amounts of soluble stannic compound, e.g., stannic chloride, with the stannous chloride. It is also obvious that other reactant materials may be added at this stage, if desired. For example, if aluminum phosphate coating by Process A is to be used, some or all of the first reagent to be added (e.g., phosphoric acid) may be incorporated in this step, and if Process C or D is to be used small amounts of one of the reactants may also be added in a pre-dispersion step.

In the above coating procedures control of pH and temperature is important. Although the initial pH of the solution may be any value less than about 7, essentially no aluminum phosphate will precipitate below a pH of about 2.2, hence the pH must reach at least this value during the coating. If the initial pH is above 3 when precipitation is begun, imperfect coatings may form and considerable aluminum phosphate may be wasted as particulate matter. Maintenance of pH in the narrow range of 2.3 to 2.6 until at least the first 10 to 20% of the precipitation is completed, appears to result in better quality coatings. No apparent coating improvement is obtained if the pH is allowed to rise above about 6.

Similarly, the best coatings appear to be obtained at precipitation temperatures of 40–60° C. The combined effect of elevated temperature and pH control in the range of about 2.3 to 2.6 appears to be particularly beneficial in promoting a high degree of mobility of freshly precipitated colloidal aluminum phosphate, permitting deposition and growth in advantageous form on the ferromagnetic chromium oxide particles and possibly altering the degree of hydration of the aluminum phosphate.

Reaction time is not critical but it will be appreciated that if the aluminum phosphate is formed too rapidly some of it will not precipitate on the oxide surfaces but will exist as unattached material. An important function of the precipitation and digestion at elevated temperature is to promote the transfer of such unattached material to the oxide particles. The best coatings are formed when the rate of precipitation is sufficiently slow to minimize formation of extraneous particulate material. Optimum time of reaction depends to some extent on temperature, reactant concentration, and surface area of the oxide.

The concentration of ferromagnetic chromium oxide in the slurry is not critical, though obviously sufficient water must be used to permit efficient mixing as the reactants are added. If excessive viscosity develops, additional quantities of water may be added. Extreme dilutions are unnecessary and wasteful. The concentration ranges of reactants employed may also vary considerably without detriment to the reaction. Either phosphate or aluminum reactant may be in excess at the conclusion of the precipitation, and the molar ratio of aluminum to phosphate in the final product may vary somewhat depending on the molar ratios of the reactants employed.

The various steps in purifying the coated products are not critical and relate only to the practical matters of isolating a product from its mother liquor. Similarly, the calcining or heat treating may be carried out over a wide range of conditions although it will be appreciated that treatment times will be shorter at higher temperatures. Thus a temperature between 250° C. and 400° C. is preferred. The oxygen-containing atmosphere, e.g., air or oxygen, may be flowing or static. The benefits of heat treatment are achieved more rapidly in pure oxygen than in air.

Any particulate form of ferromagnetic chromium oxide may be coated by the procedures of this invention. The preformed, particulate ferromagnetic chromium oxides may, if desired, contain modifiers well known in the art. Suitable chromium oxides for use as starting materials in the present invention include, for example, those described in and/or defined by the claims of U.S. Pats. 2,885,365, 2,923,683, 2,923,684, 2,923,685, 2,956,955, 3,034,988, 3,068,176, 3,117,093 and 3,278,263. These materials may exhibit a wide range of chemical, physical and magnetic properties. For example, they may be relatively coarse, largely polydomain particles with average lengths of 10 microns or more, or they may be highly acicular, single domain particles with lengths no greater than 1.5 microns and median axial ratios as high as 20:1 or more. Similarly, surface area may range from 0.8–0.9 $m.^2/g.$ to 30 $m.^2/g.$ or more, and intrinsic coercive force may be from 40–50 oersteds to above 200 oersteds. Thus, the suitable materials may represent a 30-fold to over-50-fold range in surface area, a range of at least ten-fold in particle length, and a 4-fold to over-10-fold range in intrinsic coercive force.

A preferred ferromagnetic chromium oxide composition of improved stability consists essentially of a substrate of a ferromagnetic chromium oxide having an intrinsic coercive force above 200 oersteds, a saturation induction in the range of 80–100 gauss-$cm.^3/g.$, and a remanence ratio of at least 0.35, said ferromagnetic chromium oxide being in the form of highly uniform, fine, acicular particles of a tetragonal crystal structure of the rutile type ranging up to 1.5 microns in length, and having a median axial ratio ranging from 2:1 to 20:1, essentially all of said particles constituting single magnetic domains, said ferromagnetic chromium oxide substrate having a surface coating of aluminum phosphate extending over substantially all the surface of the ferromagnetic chromium oxide particles and said aluminum phosphate being present in a concentration of about 1% to 20% by weight of the composition.

In addition to orthophosphates, the pyrophosphates, metaphosphates and hexametaphosphates of metals that form the corresponding insoluble metal salts may also be used as protective coatings on ferromagnetic chromium oxide.

In place of the various compounds of pentavalent phosphorus listed in the preceding paragraphs, there may also be used various water-soluble phosphorus salts containing phosphorus of valence lower than +5, in such a way that the coating procedure of the present invention may be conveniently coupled with the reductive surface treatment described in Bottjer and Ingersoll U.S. Pat. 3,512,930. As taught in that patent, any compound that is a reducing agent for a metal oxide and that has a standard oxidation potential in acidic media greater than about −1.5 volts will serve to produce the desired surface reduction effect. The use of hypophosphorus acid is specifically exemplified. It will be apparent that, when, for example, a phosphite compound meeting the aforementioned criterion is used to reduce the surface of a ferromagnetic chromium oxide in an acidic medium, the phosphite will be oxidized, and the result effectively will be the in situ preparation of a phosphate that can then be used for further reaction according to the precedures of the present invention.

The coated products may be characterized in a variety of ways. The amount of coating material may be determined analytically, and the physical character of the coating may be determined from electron photomicrographs and surface area measurements. An example of a photomicrograph of a coated material, the product of Example 5, is shown in the drawing, from which it may be deduced that an excellent coating of aluminum phosphate surrounds the ferromagnetic chromium oxide particles. Coating thicknesses up to 0.01 to 0.02 micron or more may be obtained.

The magnetic properties of ferromagnetic chromium oxide may be readily determined. Of chief importance are the intrinsic coercive force (iHc) expressed in oersteds, the saturation magnetization ($\sigma_s$) expressed in emu./g. (or its equivalent, gauss-cm.$^3$/g.) as determined in a 4400-gauss field, the remanence or retentivity of magnetization ($\sigma_r$) after removal of the field expressed in emu./g. The sigma values employed herein are defined on pp. 5–8 of Bozorth's "Ferromagnetism," D. Van Nostrand Co., New York (1951). These sigma values are determined in fields of 4400 oersteds on apparatus similar to that described by T. R. Bardell on pp. 226–228 of "Magnetic Materials in the Electrical Industry," Philosophical Library, New York (1955). The definition of intrinsic coercive force is given in Special Technical Publication No. 85 of the American Society for Testing Materials entitled "Symposium on Magnetic Testing" (1948), pp. 191–198. The values for the intrinsic coercive force given herein are determined on a DS ballistic-type apparatus which is a modified form of the apparatus described by Davis and Hartenheim in the Review of Scientific Instruments, 7, 147 (1936). For convenience the results of magnetic measurements will be listed as iHc/$\sigma_s$/$\sigma_r$.

From data of this type it was found that coating ferromagnetic chromium oxide with aluminum phosphate does not degrade the magnetic properties of the ferromagnetic chromium oxide. The measured difference in magnetic properties from that of the original oxide may be accounted for by the amount of magnetically inert aluminum phosphate. For example, a typical ferromagnetic chromium oxide was found to have the following properties:

$$iHc/\sigma_s/\sigma_r = 355/82.8/36.5$$

After coating with 4.8% aluminum phosphate and retesting, the magnetic properties were:

$$iHc/\sigma_s/\sigma_r = 350/79.0/34.0$$

When these data are corrected for the weight of aluminum phosphate, the values are:

$$iHc/\sigma_s/\sigma_r = 350/83.0/35.8$$

These are essentially the same as for the untreated material.

Magnetic properties of the products also reflect the effect of heat-treating the aluminum phosphate-coated ferromagnetic chromium oxides in an oxygen-containing atmosphere. The treatment provides two benefits. The first is a calcining and possible dehydrating of the alumium phosphate coating which causes essentially no change in the magnetic properties of the ferromagnetic chromium oxide if no surface reduction has occurred. This is shown by data below for an aluminum phosphate-coated ferromagnetic chromium oxide composition before and after heating in a stream of oxygen at about 330° C. for 19 hours.

| | iHc | $\sigma_s$ | $\sigma_r$ |
|---|---|---|---|
| Before heat treatment | 350 | 79.0 | 34.0 |
| After heat treatment | 350 | 79.7 | 34.5 |

The small differences appear to be within the limits of error of the measurements, but they may reflect a small weight loss due to the dehydration. It will be shown hereafter (Example 6) that this calcining or dehydrating of the protective coating substantially improves the stability of the material in magnetic tape formulations.

A second value of the heat-treatment step is that the magnetic properties of deliberately or inadvertently degraded ferromagnetic chromium oxide are "upgraded" as described in assignee's copending application. "Process for Improving Ferromagnetic Properties of Chromium Dioxide by Heating in an Oxidizing Environment" by Bottjer and Cox, U.S. Pat. 3,529,930. In the case of such "upgrading" treatment the metal phosphate coatings usually exhibit an augmented stabilizing effect. The chromium oxide may have been deliberately reduced prior to phosphate coating to facilitate dispersion during coating and subsequent tape preparation or the surface reduction may have been effected to increase the stability of the oxide. Various applicable reductive surface treatments are described in assignee's copending application "Stabilized Ferromagnetic Chromium Dioxide" by Bottjer and Ingersoll, U.S. Pat. 3,512,930. Application of $Sn^{2+}$ and/or $Sn^{4+}$ compounds as auxiliary coating materials and as adjuvants for improving dispersion is described hereinafter. Thus, once the desired benefits of surface reduction treatment to aid particle dispersion as a preliminary to coating with aluminum phosphate have been realized, the magnetic properties of the treated ferromagnetic chromium oxide can be restored to essentially their original levels.

These changes may be followed by determining the magnetic properties of the ferromagnetic chromium oxide at different stages in treatment. In the table below are data illustrating the various changes with a ferromagnetic chromium oxide which was treated according to Process E. Final analysis of the ferromagnetic chromium oxide after treatment showed 4.06% aluminum phosphate and 0.78% residual tin for a total of about 5% solids.

| | | iHc | $\sigma_s$ | $\sigma_r$ |
|---|---|---|---|---|
| 1 | Untreated material | 490 | 83.8 | 40.2 |
| 2 | After coating treatment | 520 | 76.0 | 37.2 |
| 3 | After heat treatment | 490 | 80.0 | 38.7 |
| 4 | (3) corrected for coating | 490 | 84.2 | 40.8 |

It will be seen that the magnetic properties, after correcting for the non-magnetic coating, are nearly the same as those of the original material. The small difference appears to be within experimental error, but it may reflect superior dryness of the heat-treated material compared with the original and elimination of a small amount of reduced oxide originally present.

Metal phosphate coated ferromagnetic chromium oxide exhibits reduced reactivity toward water. Reactivity with water may be easily measured by a simple color test, and a test of this sort may be used to determine whether the coating operation was successful and to obtain some indication of probable stability of the coated oxide in magnetic tape. The reaction with water may be represented by the equation:

$$3CrO_2+H_2O \rightarrow CrO_3(\text{soluble})+2CrO(OH)\ (\text{insoluble})$$

In this water test 0.5 g. of oxide is placed in 15 cc. distilled water in a one-ounce, capped bottle and agitated by slow tumbling at room temperature for 16 hours. The bottle is then placed in an oven at 65° C. The extent of reaction is determined by comparing the depth of color of the chromic acid in the supernatant liquor with that of standards, and the extent of degradation may be calculated using the above equation. Thus, a sample of untreated ferromagnetic chromium oxide having an iHc=360 oersteds developed, in this test, color equivalent to 15% decomposition of the oxide after 330 hours exposure at 65° C.

The degree of reaction is related to particle size and surface area as shown by the data below for $CrO_2$:

| Surface area: | Hours exposure for 15% reaction |
|---|---|
| 0.8–0.9 m.²/g. | >1000 hrs. |
| 14.9 | 330. |
| 22.5 | 72. |

A more realistic, accelerated test of the protective value of coatings is based on the rate of change in magnetic properties when coated oxides are formulated in tapes of the types used in the recording filed and aged at elevated temperature and high humidity. A description of a suitable procedure for preparing tapes for test is as follows:

A mixture comprising 0.4–0.6 g. of Alcoec® (a soya lecithin purchasable from American Lecithin Co.) or 0.7–1.0 g. of a low molecular weight methyl methacrylate/2-methyl-5-vinyl pyridine copolymer of approximately 90/10 by weight composition (described in Proskow U.S. Pat. 3,558,492), 30–50 cc. tetrahydrofuran, 10.0–12.0 g. of the oxide to be tested and about 50–110 g. clean Ottawa sand, 20–30 mesh, is placed in a 125 cc. beaker and milled with a disk-shaped stirrer about 1.5 in. in diameter operating at 1000–1200 r.p.m. for 45–60 min. with external cooling.

If 10.0 g. of ferromagnetic chromium oxide is used, 18.1 g. of polymer solution equivalent to a mixture of (a) 1.80 g. of commercially available preformed polyester-polyurethane resin based on diphenylmethane diisocyanate, adipic acid, and an alkanediol having 2–4 carbon atoms in a 15 wt. percent solution in tetrahydrofuran and (b) 1.80 g. of an 80/20 by weight vinylidene chloride/acrylonitrile copolymer as a 30 weight percent solution in 4-methyl-2-pentanone is then added to the slurry. If 12.0 g. of ferromagnetic chromium oxide is used, 15.2 g. of a 15% solution of preformed polyester-polyurethane in tetrahydrofuran and 7.6 g. of a 30% solution of an 80/20 by weight vinylidene chloride/acrylonitrile copolymer in acetone or in 4-methyl-2-pentanone are added. Stirring is continued for an additional 0.5 hr. The slurry is filtered free of sand through a 2–5 micron filter, optionally covered with a 1 cm. layer of 180–240 mesh sand. The viscosity of the mixture is adjusted, as necessary, to 5–10 poises either by addition of tetrahydrofuran or evaporation of solvent.

The resulting dispersion is cast with a doctor knife set at a 3-mil clearance on 1.5-mil poly(ethylene terephthalate) film temporarily attached to a glass plate, and the wet tape is passed between opposing magnets to orient the ferromagnetic material. After drying, the tape is stripped from the glass support and optionally calendered at about 105° C. and 1100 p.l.i. by passing it between heated rolls. The finished tape is then evaluated to test its aging characteristics.

The rate of degradation of the magnetic tape may be conveniently determined by following the change in its remanent magnetic flux density. In order to obtain meaningful data in a reasonable time, it is convenient to accelerate the aging process by suspending film samples in closed vessels over an appropriate aqueous salt solution that provides a relative humidity of 50% at 65° C. and storing the vessels in an oven at that temperature. The change in remanent flux density is recorded and calculated in terms of the time in days required for 10% loss in initial remanent flux density. This value, "$t_{10}$", is termed stability factor.

Untreated ferromagnetic chromium oxide ages in tapes at rates depending inter alia on its particle size and surface area, and the particular dispersants and binders used in preparing the tapes. Thus, a tape made from high surface area oxide is less stable than one made from low surface area oxide, and a tape prepared with Alcolec® soya lecithin dispersant is less stable than one prepared under the same conditions with a poly(methyl methacrylate/2-methyl-5-vinyl pyridine) dispersant (hereinafter termed PMVP) as described in the formulation above. Illustrative data are shown in Table I.

TABLE I

| $CrO_2$ surface area in m.²/g. | Dispersant | $t_{10}$, days 65° C./50%RH |
|---|---|---|
| ~15 | Alcolec® | 1.5–2.0 |
| 22.5 | do. | 1.1–1.3 |
| ~15 | PMVP | 15–20 |
| 22.5 | PMVP | 10–13 |

Tape characteristics such as output, $B_r/B_s$ (the fraction of magnetic flux density remaining after applying a 4400-gauss field and then reducing the field to zero), and tape smoothness are not significantly altered by properly applied metal phosphate coatings. The excellent qualities of tapes prepared with coated oxides are best exemplified by referring to data in Example 18.

The examples that follow are illustrative of the methods that may be used to apply coatings of metal phosphates on ferromagnetic chromium oxide to provide protection against chemical attack and to enhance the stability of magnetic tape to minimize the loss in residual magnetic flux. Increases in $t_{10}$ reflect the improvements in stability achieved in different formulations.

In order that the examples can be more easily followed, the different oxides used in the examples are listed and identified by letter in Table II accompanied by pertinent characterization data. The oxides used in the examples and identified in Table II were made by the procedures described in Arthur U.S. Pat. 2,956,955 and Cox U.S. Pat. 3,278,263.

TABLE II

| Oxide code | Form | iHc | $\sigma_s$ | Surface area, m.²/g. |
|---|---|---|---|---|
| A | Powder | 382 | 82.6 | 17.0 |
| B | Undried oxide from synthesis [1] | 420 | 83.7 | 17.6 |
| C | do.[1] | 348 | 77.1 | |
| D | Powder | 46 | 91.4 | 0.8 |
| E | Wet filter cake [1] | 350 | 82.8 | 15.0 |
| F | do.[1] | 380 | 82.5 | 14.5 |
| G | do.[1] | 382 | 83.9 | 17.3 |
| H | Powder | 490 | 83.8 | 22.5 |

[1] Magnetic properties determined after drying the oxide.

The term "sodium aluminate" refers to a commercially available solid purchased from the Reynolds Metals Co., stated to analyze as 42 to 43 percent $Al_2O_3$. Independent analysis has shown 22.7 percent Al and 22.6 percent sodium. Titration indicated about 4 percent (calculated as NaOH) strong base having a neutralization curve mid-point at pH 9.75.

While the examples describe operation at atmospheric pressure, this is purely a matter of convenience and both higher and lower pressures may be used.

All parts and percentages are by weight, unless indicated otherwise.

EXAMPLE 1

In a 600 cc. beaker were placed 50 g. of ferromagnetic chromium oxide (Oxide A) and 300 cc. of water, and the mixture was stirred with a propeller-type stirrer. 5.415 g. (0.041 mole) of $(NH_4)_2HPO_4$ was dissolved in the mixture. To the stirred mixture was then added at a slow rate 9.899 g. (0.041 mole) of $AlCl_3 \cdot 6H_2O$ in 100 cc. of water at room temperature. After 69 cc. of the solution had been added in about 45 minutes, the mixture was allowed to stand 1 hr. Stirring and addition of aluminum chloride solution were recommenced and the remainder of the aluminum chloride solution was added in about 53 minutes. Then 41 cc. of a 1 normal aqueous ammonia solution (prepared by diluting 6.67 cc. of commerical concentrated ammonia to 100 cc.) was added over a 45-min. period after which the pH was found to be 3.4.

The stirrer was removed and the magnetic particles were caused to settle by placing the beaker over a magnet. The mother liquor, which was yellowish and milky, was decanted. The slurry was washed nine times with 250 cc. portions of water, each time stirring for 5 minutes, settling magnetically and decanting. Only the original mother liquor and the final wash were very milky. The last few washes were free of color and the ninth wash gave no test for chloride ion. Following the water washes, the product was washed four times with acetone and dried in vacuum at room temperture. It was then passed through a 100-mesh screen and re-dried over phosphorus pentoxide overnight in vacuo. The recovered product weighed 51.7 g.

Analysis showed the material to contain 0.93% Al (0.0346 gram atom) and 3.28% $PO_4$ (0.0345 mole), thus indicating a 1:1 mole ratio of Al to $PO_4$. Solids in the mother liquor and first water wash were found to weigh about 3.2 g. This material was bluish-gray, non-magnetic and almost completely soluble in dilute nitric acid and dilute potassium hydroxide but insoluble in dilute acetic acid—facts suggesting it to be aluminum phosphate contaminated with a little ferromagnetic chromium oxide and representing only a portion of the aluminum phosphate that had been formed.

Electron photomicrographs showed that the ferromagnetic chromium oxide particles were partially coated with the precipitated aluminum phosphate. The surface area of the treated ferromagnetic chromium oxide was 20.9 m.$^2$/g. as measured by nitrogen adsorption while that of the original oxide was 17.0 m.$^2$/g. Magnetic properties after treatment were $iHc/\sigma_s/\sigma_r=390/79.9/36.5$. In a water test the treated sample degraded 0.8% in 143 hours as compared with 15% for an uncoated control, thus indicating greatly reduced reactivity for the treated sample. Samples of both treated and untreated oxide were formed into magnetic tapes according to the procedure described above except for the following variations. In the initial formulation the weights of materials were:

| | | |
|---|---|---|
| $CrO_2$ | g. | 12 |
| Alcolec® | g. | 0.48 |
| Sand | g. | 108 |
| Tetrahydrofuran | cc. | 38 |

This material was placed in a bottle and shaken on a paint shaker (instead of milling) for 45 minutes after which there was added 15.2 g. of a 15 percent by weight solution of preformed polyester-polyurethane resin in tetrahydrofuran and 7.6 g. of a 30 percent by weight solution of 80/20 by weight vinylidene chloride/acrylonitrile copolymer in acetone, and the mixture was shaken for an additional 30 minutes. After removing sand, magnetic tape was prepared as described and samples were tested for stability. The stability factor, $t_{10}$, was 2.9 days vs. 2.3 days for a similar tape containing uncoated oxide. Thus stabilizing action was obtained.

EXAMPLE 2

The procedure of Example 1 was followed, except that the order of addition of the phosphate and aluminum salts was reversed. 50 g. of Oxide A and 300 cc. of water were placed in a 600 cc. tall-form beaker equipped with a paddle stirrer. The pH of the slurry was 3.37. To the slurry was added 9.899 g. (0.041 mole) of solid $AlCl_3 \cdot 6H_2O$. The pH of the mixture decreased to 2.94.

At this point 5.415 g. (0.041 mole) of $(NH_4)_2HPO_4$ in 50 cc. of water was added at room temperature over a period of 72 minutes. The pH decreased to 2.21. Dropwise addition of 1 N aqueous ammonia solution was begun and continued until the pH reached 7.0. The volume required was 69.4 cc. and the total addition time was 72 minutes.

The slurry was filtered and the solid was washed 8 times with 250 cc. portions of water, each time slurrying 5 minutes, settling magnetically and decanting. The original mother liquor was greenish yellow and tested for chloride ion and $Cr^{6+}$. The treated ferromagnetic chromium oxide was rinsed 4 times with acetone and dried in a current of air, then in vacuo over phosphorus pentoxide, and passed through a 100-mesh screen. The product weighed 51.7 g. Analyses showed the presence of 1.12% (0.041 gram atom) aluminum and 2.99% phosphate (0.031 mole), suggesting an excess of aluminum over that required for $AlPO_4$. The surface area was 21.6 m.$^2$/g. compared with 17.0 m.$^2$/g. for the untreated material. The magnetic properties were $iHc/\sigma_s/\sigma_r=397/78.6/36.2$. The $\sigma_s$ after correcting for the weight of aluminum phosphate was 82.5 which is the same as that of the uncoated chromium oxide. Thus, there was no degradation during coating. In the water test, uncoated oxide underwent about 15% reaction in 144 hours vs. only about 1–1.5% reaction for the coated material.

EXAMPLE 3

In a water-jacketed Waring "Blendor" were placed 100 g. of Oxide A (prescreened through a 100-mesh screen) and 300 cc. of water. The agitator was started and 16.24 g. (0.123 mole) of solid $(NH_4)_2HPO_4$ was added. After 15 minutes of blending, the dropwise addition of an aluminum nitrate solution [formed by dissolving 46.14 g. (0.123 mole) of $Al(NO_3)_3 \cdot 9H_2O$ in 55 cc. of water] was begun at room temperature. Addition was completed in about 52 minutes, following which 123 cc. of 1 N aqueous ammonia solution was added dropwise in about 64 minutes. The resulting mixture had a pH of 3.91.

Half of the above slurry was filtered. The filter cake was washed twice by slurrying it in 350 cc. of water and filtering and five times by slurrying it in 500 cc. of water, each time settling magnetically and decanting. After further washing with acetone and drying, the product weighed 61.5 g., contained 2.15% Al and 7.14% phosphate, had an Al/$PO_4$ mole ratio of 1.06, a surface area of 29.4 m.$^2$/g., and magnetic properties of $$iHc/\sigma_s/\sigma_r=395/74.5/34.0$$

The $\sigma_s$ after correcting for the weight of aluminum phosphate was 82.0 which is nearly the same as the original. Electron photomicrographs showed an irregular partially attached second phase and the water test showed reaction of about 1% in 168 hrs. A magnetic tape, formulated in the manner described in Example 1, had a $t_{10}$ of 3.4 days compared with 1.8 days for the control.

EXAMPLE 4

A 106.7 g. quantity of wet Oxide B (about 50 g. of ferromagnetic chromium oxide) was placed in a water-jacketed stainless steel "Osterizer" with 100 cc. of water. A solution of 10.64 g. of commercial 85% phosphoric acid (0.092 mole) diluted to 100 cc. with water was added and the mixture was blended and allowed to stand for about 90 minutes. To the vigorously stirred slurry was added dropwise at room temperature over a 2.3-hour period 81.8 cc. of a solution prepared by dissolving 7.38 g. of commercial sodium aluminate in 100 cc. of water. The pH rose from 1.70 to 7.00 during the addition.

The slurry was transferred to another container, allowed to settle magnetically overnight, and filtered. The clear orange-yellow filtrate gave positive tests for chromate and phosphate ions. The solid was thoroughly washed as described in previous examples. The dried material weighed 54.30 g. and contained 2.05% Al and 5.72% phosphate ($Al/PO_4$ mole ratio=1.26).

The surface area was 29.4 m.$^2$/g. compared with 17.6 m.$^2$/g. for the untreated oxide. Magnetic properties were iHc/$\sigma_s$/$\sigma_r$=438/74.3/33.8. Electron photomicrographs showed a second phase well coated over the ferromagnetic chromium oxide particles. In a water test the material showed only about 1.3% degradation after 620 hours as contrasted to 11.2% in 168 hours for the uncoated oxide. A magnetic tape prepared in the manner already described using Alcolec® dispersant had a stability ($t_{10}$) of 3.2 days which is materially higher than expected for uncoated oxide.

EXAMPLE 5

The procedure of Example 4 was duplicated except for use of larger quantities of reactants, a temperature of 57–70° C., and a water-jacketed reactor. Oxide B (213.4 g., i.e., about 100 g. of ferromagnetic chromium oxide) was placed in the reactor with 100 cc. of water. A solution of 21.28 g. of 85% phosphoric acid in 100 cc. of water was added with stirring and the slurry was heated to 58° C. Sodium aluminate solution was prepared by dissolving 14.76 g. of commercial sodium aluminate in 200 cc. of water and 159 cc. of the solution was added dropwise over a period of about 3 hours. The pH of the slurry rose from 1.50 to 6.00. Additional water (300 cc.) was added during the course of the reaction to maintain good agitation.

The slurry was filtered and the filter cake was washed by slurrying in water, rinsed with acetone and dried as described in previous examples. The product weighed 111.8 g. and had an Al content of 2.26% and a $PO_4$ content of 9.16% ($Al/PO_4$ mole ratio 0.87). The surface area was 14.6 m.$^2$/g. compared with 17.6 m.$^2$/g. for untreated material, and electron photomicrographs showed good phosphate coating of the ferromagnetic chromium oxide particles. In the water test only 0.8% reaction occurred in 1300 hours as contrasted to 15% reaction in 144 hours in the case of the uncoated material. The magnetics were iHc/$\sigma_r$/$\sigma_s$=417/73.1/32.7. The corrected $\sigma_s$ was 82.5.

A magnetic tape prepared in the manner described above using Alcolec® as a dispersant had a considerably enhanced $t_{10}$ of 4.8 days as contrasted to tests with uncoated oxide. When this treated oxide was incorporated in tape using the same procedure but with poly(methyl methylacrylate/2-methyl-5-vinyl pyridine) (PMVP) as dispersant, the $t_{10}$ was 39 days. In contrast, a control sample using PMVP had a $t_{10}$ of 15–20 days.

EXAMPLE 6

Part A

A 105.7 g. quantity of Oxide B (about 50 g. of ferromagnetic chromium oxide) was placed in a water-jacketed "Osterizer" mixer. To the stirred mixture was added a solution of 12.02 g. of 85.4% phosphoric acid in 200 cc. of water and 32 cc. of a clear solution of 8.34 g. of commercial sodium aluminate in 100 cc. of water. More water (100 cc.) was added and the temperature was raised to 80° C. Addition of the remaining sodium aluminate solution (70 cc.) was continued with stirring over a period of 115 minutes during which time the pH of the slurry rose from 2.33 to 6.00. The slurry was then digested at 80° C. for about 15 minutes, removed to another container and allowed to settle magnetically. The supernatant liquor was decanted, the treated oxide was washed 6 times by slurrying, magnetic settling, and decantation and finally washed with acetone, filtered and dried. Analysis disclosed that the material contained 2.86% Al and 11.30% $PO_4$ ($Al/PO_4$ mole ratio=0.89). The surface area was 19.9 m.$^2$/g. compared with 17.6 m.$^2$/g. for untreated material. Electron photomicrographs indicated smooth to irregular coatings. Magnetic properties were iHc/$\sigma_s$/$\sigma_r$=425/71.2/31.6.

Part B

A portion of the product was incorporated in magnetic tape using Alcolec® dispersant. This material had a $t_{10}$ of 3.2 days.

Part C

A second portion (20 g.) was placed in a platinum boat in a tubular furnace through which oxygen was passed at 20 liters/hour while the temperature was raised to and held at 345–350° C. for about 7 hours. Magnetic properties of the product were iHc/$\sigma_s$/$\sigma_r$=410/71.8/32.3 and were not changed by an additional heat treatment in oxygen for 1.5 hours at 325° C. When a sample of this heat-treated material was tested in a magnetic tape in the same manner as the control sample in Part B, the $t_{10}$ was found to be 5.1 days, thus showing a significant improvement in stability as a result of the heat treatment.

EXAMPLE 7

Oxide E (225 g., about 100 g. of ferromagnetic chromium oxide) was placed in a 16 oz. jar together with 290 g. of 20–30 mesh sand and 100 cc. of a solution containing 11.14 g. of 85% phosphoric acid. The container was closed and shaken for 1 hour on a commercial paint shaker and 75 cc. of additional water was added. The mixture was allowed to stand overnight at about 4° C. after which it was again agitated for 15 minutes on the shaker. The mixture was diluted with 800 cc. of water and filtered through a 200-mesh wire screen to remove the sand. The filtered slurry of ferromagnetic chromium oxide was transferred to a 2-liter, water-jacketed vessel together with about 200 cc. of water and heated to 60° C. with good stirring by means of a paddle stirrer. Part (160 cc.) of a solution of 7.38 g. of commercial sodium aluminate in 200 cc. of water was added at about 0.8 cc./min. over a 3.3 hour period. The pH rose from 1.9 to 6.0 at which time addition was stopped. During this addition 200 cc. of water was added to maintain a smooth slurry consistency.

The mixture was digested for 15 minutes at 60 °C., cooled to 35° C., and filtered. The filter cake was thoroughly washed with water and acetone and dried. The product weighed 127 g. Analytical tests showed 1.00% Al and 3.88% $PO_4$ (mole ratio $Al/PO_4$=0.89). The surface area was 13.7 m.$^2$/g. compared with 15.0 m.$^2$/g. for untreated material, indicating reduced surface area. Electron photomicrographs showed that the particles were coated, and the water test resulted in only 1.3% reaction in 1,000 hours compared with 15% reaction in 330 hours for the uncoated starting oxide. Magnetic properties were $$iHc/\sigma_s/\sigma_r=350/79.0/34.0$$

Part of the product was heated in flowing oxygen at 330° C. for 19 hours. Magnetic properties after heat treatment were iHc/$\sigma_s$/$\sigma_r$=350/79.7/34.5, i.e., essentially unchanged. Magnetic tape made from the original, untreated oxide using Alcolec® as dispersant had a $t_{10}$ of 1.5 days. When tape was made from the treated oxide and Alcolec®, the $t_{10}$ was 3.5 days. Tape made from the treated oxide and PMVP dispersant had a $t_{10}$ of 66 days.

EXAMPLE 8

The general procedure and oxide used in Example 7 were employed with the following changes. The phosphoric acid solution was prepared by diluting 16.71 g. of 85% phosphoric acid to 100 cc. The sodium aluminate solution contained 11.07 g. of commercial sodium aluminate in 200 cc. of water. A total of 164 cc. of the latter solution was added over about 4 hours during which time the pH rose from 1.95 to 6.00. The final product weighed 132 g. and analyses showed 1.39% Al and 5.15% $PO_4$ ($Al/PO_4$ mole ratio—0.95). This material in a water test showed only about 1.4% reaction in 2300 hours as contrasted to 15% in 330 hours for an untreated control. Magnetic properties were $iHc/\sigma_s/\sigma_r$=360/76.0/32.6. Magnetic tape formed with Alcolec® as dispersant from a sample heat-treated as in Example 7, had a $t_{10}$ of 8.2 days vs. a $t_{10}$ of 1.5 days for a control.

EXAMPLE 9

The general procedure and oxide employed in Example 7 were used except that 150 g. of wet ferromagnetic chromium oxide filter cake, 240 g. of sand and 1.9 g. of 85% phosphoric acid in 100 cc. of water were shaken in a 32 oz. jar for 1 hour. An additional 200 cc. of water was added and the mixture was shaken 0.5 hour. A total of 68 cc. of a sodium aluminate solution (1.25 g. of commercial sodium aluminate in 75 cc. of water) was added over a period of about 1.8 hours during which time the pH rose from 2.42 to 6.00. The isolated product (69 g.) contained 0.38% Al and 1.20% $PO_4$ ($Al/PO_4$ mole ratio 1.11). The magnetic properties were $iHc/\sigma_s/\sigma_r$=360/81.5/35.3. After heat treatment and preparation in tape form using PMVP as dispersant, a $t_{10}$ of 30 days was obtained. The control sample was the same dispersant had a $t_{10}$ of 15 days.

EXAMPLE 10

A 143.7 g. quantity of Oxide C (about 50 g. of ferromagnetic chromium oxide) was placed in a water-jacketed "Osterizer" and diluted with 256 cc. of water. Stirring was begun and the two solutions described below were added simultaneously from burettes at about the same rate. The first solution comprised 23.08 g. of $Al(NO_3)_3 \cdot 9H_2O$ in 100 cc. of aqueous solution. The second solution was formed by diluting 8.12 g. of $(NH_4)_2HPO_4$ in 61.5 cc. of 1 N aqueous ammonia to 100 cc. with water. Addition was completed in 1.5 hours during which time the pH decreased from 4.7 to 3.0.

The slurry was removed from the "Osterizer," and the coated oxide was isolated, washed and dried as described previously. The recovered oxide weighed 56.5 g. In the water test this material showed a degradation (reaction) of about 0.75% in 700 hours as compared to 11.3% in about 240 hours for the unreacted oxide. A sample formed into magnetic tape using Alcolec® dispersant had a stability factor of 2.1 days vs. 1.9 days for the untreated oxide.

EXAMPLE 11

In a 32 oz. jar was placed 140 g. of oxide F (about 60 g. of ferromagnetic chromium oxide), 240 g. of 20–30 mesh sand and 100 cc. of water. The mixture was shaken on a paint mixer for 1 hour, diluted with 200 cc. of water and shaken for another 0.5 hour. After storage overnight at about 4° C., the slurry was briefly agitated, filtered through a 200-mesh screen to remove sand, and transferred with 300–400 cc. of additional water to a water-jacket reactor. Stirring was begun and, after heating to 60° C., the pH of the slurry was adjusted to 2.18 by adding 5 cc. of 3 N hydrochloric acid. Slow addition of 4.5 g. of 85% phosphoric acid in 75 cc. of water was then begun, and after 9 cc. of this solution had been added (pH=2.10), simultaneous addition of a solution of 2.5 g. of commercial sodium aluminate in 75 cc. of water was commenced at a rate of about 0.6 cc./min. The phosphoric acid solution was completely added in 1.25 hours during which time the pH rose to 2.42. The sodium aluminate solution addition was continued until it was exhausted (75 cc.), and 22 cc. of a solution of 3.0 g. of commercial sodium aluminate in 75 cc. of water was introduced. The pH of the slurry was 6.00. The treated oxide was isolated as previously described.

Oxide coated by this simultaneous addition procedure had an Al content of 1.08% and a $PO_4$ content of 3.81% (mole ratio=1.0). The surface area was 16.3 $m.^2/g.$ compared with 14.8 $m.^2/g.$ for the uncoated oxide. Electron photomicrographs showed good coating. Magnetic tape formed from a heat-treated sample of this oxide using Alcolec® dispersant had a $t_{10}$ of 7.1 days, and a tape using PMVP dispersant had a $t_{10}$ of 64 days. This compares with 1.3 days for a control in which Alcolec® was used. All tapes were prepared as described previously. The aforesaid heat treatment involved heating the coated oxide for 19 hours at 328° C. in flowing oxygen.

EXAMPLE 12

Oxide G (111 g., about 50 g. of ferromagnetic chromium oxide) was placed in a 16 oz. jar with 240 g. of 20–30 mesh sand and a solution of 3.36 g. of $SnCl_2 \cdot 2H_2O$ and 0.5 cc. of commercial, concentrated hydrochloric acid in 175 cc. of water. The mixture was shaken for 1.5 hours on a pain mixer. Dispersed oxide was then separated from sand by filtering through nylon felt and transferred to a water-jacketed "Osterizer" with 200 cc. of water and stored overnight at about 4° C. Stirring was then begun, and a solution of 11.14 g. of 85% phosphoric acid diluted to 50 cc. with water was added slowly over several minutes. The slurry was heated to 61° C. and addition of a solution of 7.38 g. of commercial sodium aluminate in 100 cc. of water was begun. When 89 cc. of this solution had been added, the pH had risen from 1.45 to 3.55 and the reaction was stopped (1.5 hours addition time).

The product, after filtering, washing, and drying by methods previously described, weighed 58 g. and had an Al content of 2.34%, a $PO_4$ content of 10.17% ($Al/PO_4$ mole ratio=0.84), and a Sn content of 2.75%. Magnetic properties were $iHc/\sigma_s/\sigma_r$=405/63.8/27.2. The $\sigma_s$ after correction for aluminum phosphate and tin was 76.0, thus showing that some surface reduction had occurred. In the water test the material degraded only 0.8% in 1,000 hours. An untreated sample degraded 15% in 120 hours. A sample placed in magnetic tape with Alcolec® dispersant had an outstanding stability $t_{10}$=16 days.

EXAMPLE 13

The general procedure of Example 11 was used in this experiment. In a 32 oz. jar was placed 240 g. of Oxide E (about 115 g. of ferromagnetic chromium oxide), 325 g. of 20–30 mesh sand and a solution of 3.0 g. of $$SnCl_2 \cdot 2H_2O$$

and 0.3 cc. of concentrated hydrochloric acid in 100 cc. of water. After shaking one hour on a paint mixer, 100 cc. of water was added and the slurry was reshaken for 0.5 hour and stored at about 4° C. overnight. The mixture was redispersed by shaking, sand was separated by filtering through a 200-mesh screen, and the slurrry was transferred to a water-jacketed reactor with 800 cc. of water. The slurry was stirred and heated to 60° C., and addition of a solution of 10 g. of 85% phosphoric acid in 100 cc. of aqueous solution was begun. After 10 cc. of the phosphoric acid solution had been added, simultaneous addition of a solution of 6.38 g. of commercial sodium aluminate in 100 cc. of water was commenced at about 0.6 cc./min. The phosphoric acid addition was completed in about 2 hours during which time the pH rose from 2.05 to 2.50. The sodium aluminate addition was continued until the pH reached 6.00 which required 96 cc. of the solution.

After 15 minutes digestion, the treated oxide was isolated by filtering, washing and drying as previously described. The final weight was 118 g. and the material contained by analysis 1.27% Sn, 1.22% Al and 3.15% $PO_4$ ($Al/PO_4$ mole ratio, 1.04). In the water test only 1.3% degradation occurred in 1000 hours (control material degraded 15% in 330 hours). Magnetics were $iHc/\sigma_s/\sigma_r$=390/73.2/33.6. Part of the product was heat-treated in oxygen at 330° C. for 19 hours. This material had magnetics of $iHc/\sigma_s/\sigma_r$=385/76.4/35.1. The $\sigma_s$ after correction for phosphate and tin content was 81.2—nearly the same as the original. These data show that the magnetic loss caused by surface reduction was recovered by the heat treatment. When the heat-treated product was placed in tape with Alcolec® dispersant, $t_{10}$ was 10 days, while the PMVP as dispersant $t_{10}$ was 67 days. An untreated oxide (Alcolec® dispersant) had a $t_{10}$ of 1.5 days.

EXAMPLE 14

65 g. of Oxide H, 160 g. of 20–30 mesh sand and 200 cc. of water containing 20 g. of sodium hydrogen sulfite were shaken in a 16 oz. jar for 1 hour, then diluted with 100 cc. of water and shaken for an additional hour. The mixture was filtered on a sintered glass filter to retain both sand and ferromagnetic chromium oxide, and the filter cake was washed with water to remove soluble salts. A small sample of ferromagnetic chormium oxide isolated from this mixture had the magnetic properties $iHc/\sigma_s/\sigma_r=520/75.0/36.3$, indicating significant surface reduction. The ferromagnetic chromium oxide and sand were transferred back to a 16 oz jar, shaken briefly with 200 cc. of water and allowed to stand overnight at about 4° C. After additional brief shaking to redisperse the oxide, sand was separated by pressure filtration through 200-mesh screen and the slurry of ferromagnetic chromium oxide was placed in a water-jacketed reactor with 300 cc. of additional water.

Temperature was raised to 60° C., the mixture was stirred, and addition of a solution of 10 g. of 85% phosphoric acid made up to 100 cc. volume with water was started. After 5 cc. of this solution had been added, simultaneous addition of a solution of 5.0 g. of commercial sodium aluminate in 98 cc. of water was commenced. When 30 cc. of phosphoric acid solution had been added (40 minutes), the pH had risen from 2.55 to 2.61 and phosphoric acid addition was stopped. Sodium aluminate addition was continued until 50 cc. had been added and the pH had reached 6.0. The pH was held at 6.0 during the addition of the last few cc. of sodium aluminate solution by adding a few drops of dilute aqueous hydrochloric acid.

After the product was isolated, analysis gave 0.89% Al and 3.06% $PO_4$ ($Al/PO_4$ mole ratio=1.02). Magnetic properties were $iHc/\sigma_s/\sigma_r=530/71.0/34.0$, and surface area was 21.7 m.²/g. compared with 22.5 m.²/g. for the untreated oxide. A water test showed 1.8% degradation in 1000 hours (untreated oxide degraded 15% in 72 hours). After heat treatment in oxygen at 330° C. for 19 hours, the product had magnetic properties of $$iHc/\sigma_s/\sigma_r=470/80.1/38.8$$

The $\sigma$ after correction for aluminum phosphate was 83.5—the same as the starting oxide—thus indicating that the heat treatment had reconverted reduced oxide to ferromagnetic chromium oxide. A portion of the heat-treated material was placed in tape using Alcolec® dispersant. The $t_{10}$ was 2.6 days. When PMVP was used as dispersant for the heat-treated material, $t_{10}$ was 24.0 days. The original oxide (Alcolec® dispersant) gave tape with a $t_{10}$ of 1.1 days.

EXAMPLE 15

Part A

The general procedure of Example 12 was used except that (1) quantities of reactants were different, (2) pH was controlled by the use of both phosphoric acid and aqueous hydrochloric acid and (3) conditions were adjusted such that a significant excess of aluminum over phosphate was deposited on the ferromagnetic chromium oxide.

A mixture of 125 g. of Oxide H, 320 g. of 20–30 mesh sand, and 300 cc. of water containing 2.0 g. of $SnCl_2\cdot 2H_2O$ and 1 cc. of concentrated hydrochloric acid was shaken on a paint mixer for 1 hour, then diluted with 200 cc. of water and shaken an additional 0.5 hour. After standing overnight at about 4° C., the mixture was reshaken, filtered through a 200-mesh screen to remove sand, and transferred to a water-jacketed reactor with 1000 cc. of additional water.

Stirring was started, temperature was raised to 60° C., and addition of a solution of 6.25 g. of commercial sodium aluminate in 97 cc. of water was commenced. The initial pH of the solution was 2.10. After 6 cc. of sodium aluminate solution had been added, pH was 2.26 and simultaneous addition of 5 g. of 85% phosphoric acid in 75 cc. of water was begun. The pH of the slurry was maintained between 2.4 and 2.6 by controlling the rate of phosphoric acid addition while maintaining the sodium aluminate addition at about 0.6 cc./min. After 1 hour all of the phosphoric acid solution and 38 cc. of sodium aluminate solution had been added. Additional water (300 cc.) was also added during this time to improve stirring of the slurry. Addition of sodium aluminate solution (31 cc.) was continued, and the pH was permitted to rise to 5.0 at which time addition of 0.05 N hydrochloric acid was begun to control the pH at 5.0 until a total of 90 cc. of sodium aluminate solution had been introduced (21 cc. more). About 31 cc. of dilute hydrochloric acid was required to control pH which was finally allowed to rise to 6.0 at the end of the treatment.

The treated oxide was filtered, washed and dried. Analysis showed 1.10% Al, 2.96% $PO_4$ and 0.78% Sn. In this experiment the mole ratio of $Al/PO_4$ was 1.30 so that an excess of Al was present. The magnetic properties were $iHc/\sigma_s/\sigma_r=520/76.0/37.2$. The surface area was 23.7 m.²/g. compared with 22.5 m.²/g. for an untreated control. A water test showed about 2.5% degradation in 1000 hours compared with untreated material that degraded 15% in only 72 hours.

Part B

After a sample of the product was heat-treated in oxygen for 19 hours at 328° C., its magnetic properties were $iHc/\sigma_s/\sigma_r=490/79.5/38.7$. A portion of this material was placed in a magnetic tape using PMVP as dispersant. The $t_{10}$ of 29 days indicates substantial stabilization as contrasted with 12.5 days for untreated oxide in the same formulation.

Part C

This example illustrates the use of aluminum phosphate coated $CrO_2$ in thermomagnetic imaging. A portion of the coated ferromagentic chromium oxide from Part A was formed into a thermomagnetic recording film in the following manner: 8.5 g. of the coated oxide, 2.1 g. of Aroplaz® 1271, a commercial alkyl resin (glycerol/acid anhydride condensation product) purchasable from Archer, Daniel, Midlands Co., and 4.5 cc. of Stoddard solvent were mulled for 400 passes in a laboratory muller to form a paste. Lexan® film (General Electric Co.'s polycarbonate film) which had been embossed against a master to give 570 lines/inch about 0.3 mil deep and 0.7 mil wide was filled with the prepared paste by doctor knifing it into the grooves and skiving off the excess. After the film had cured for a day, the excess material between the grooves was removed by treatment with an aqueous slurry of 0.3 micron $Al_2O_3$.

The film was reflex exposed against an opaque printed document using a 7" diameter integrating sphere in which was located a 3" long FX-38-3 flashtube (Edgerton, Germhausen, and Grier Xenon flash lamp 3" between electrodes). This flash lamp was subjected to the discharge of a condenser bank of 400 microfarads charged at 880 volts. The exposed film was mounted on a 5" diameter aluminum drum, and the image was developed using a magnetic roll applicator, as described in copending application Ser. No. 767,977, filed Oct. 16, 1968, Example 4 (except that a rinse roll was used instead of dipping the film into the pigment slurry). After transfer to copy paper, a faithful image of the original document was produced.

EXAMPLE 16

In this experiment the same procedure as that used in Example 12 was used. A 125 g. quantity of Oxide H, 320 g. of 20–30 mesh sand, and 300 cc. of water containing 1.0 g. of $SnCl_2 \cdot 2H_2O$ and 0.25 cc. of concentrated hydrochloric acid were shaken for 1 hour in a container on a paint mixer. After the addition of 200 cc. of water and a further shaking of 0.5 hour, the mixture was stored overnight at about 4° C., briefly redispersed the next morning and transferred with 600 cc. of water to a water-jacketed reactor after removal of the sand by screening. The slurry was stirred and heated to 40° C. before the pH was adjusted to 2.35 by addition of 1 cc. of about 3 N hydrochloric acid. Addition of aqueous phosphoric acid was commenced (10.0 g. of 85% phosphoric acid in 100 cc. of water), and the simultaneous addition of aqueous sodium aluminate (7.5 g. of commercial sodium aluminate in 100 cc. of water) was begun after 9 cc. of the phosphoric acid solution had been added. The pH was controlled at about 2.5 by controlling the rate of phosphoric acid addition while the sodium aluminate solution was added at a constant rate of about 0.6 cc./min. When all of the phosphoric acid was added (about 70 min.), the pH was allowed to rise gradually to 6.00 at which time 81 cc. of sodium aluminate solution had been added.

The coated ferromagnetic chromium oxide was washed and isolated and found to contain 1.27% Al, 3.60% $PO_4$ and 0.40% Sn. A portion of this material was heated-treated in oxygen for 19 hours at 328° C. The magnetic properties were $iHc/\sigma_s/\sigma_r$=490/78.0/38.6. Magnetic tapes were prepared using Alcolec® and PMVP dispersants. $t_{10}$ stabilities were 4 and 48 days respectively compared with 1.3 and 12 days respectively for control tapes prepared from uncoated oxide, thus showing a fourfold improvement in stability as a result of the treatment.

EXAMPLE 17

An 80 g. quantity of Oxide H, 160 g. of 20–30 mesh sand and 300 cc. of water were shaken for 1 hour, then diluted with 200 cc. of water and shaken for an additional 0.5 hour. After overnight storage, redispersion, and separation of the sand by screening, the ferromagnetic chromium oxide slurry was placed in a water-jacketed reactor with 600 cc. of additional water and kept at 27° C. with sufficient stirring to provide good mixing. The pH was adjusted to 2.20 with aqueous hydrochloric acid and addition of 3.8 g. of 85% phosphoric acid in 75 cc. of water was commenced. After 10 cc. of phosphoric acid solution was added, simultaneous addition of sodium aluminate solution (2.5 g. of commercial sodium aluminate in 75 cc. of water) was begun at about 0.6 cc./min. pH was controlled at 2.35–2.40 by addition of 5 cc. of 3 N hydrochloric acid as necessary until 51 cc. of the sodium aluminate solution had been added. The pH was then allowed to rise to 6.00 during further addition of sodium aluminate. This required all of the original sodium aluminate solution and an additional 35 cc. of a solution containing 3.0 g. of commercial sodium aluminate in 75 cc. of water. The product was isolated as in previous examples.

Analysis showed the presence of 1.02% Al and 3.21% $PO_4$ and a surface area of 23.3 m.²/g. compared with 22.5 m.²/g. for untreated material. The magnetic properties where $iHc/\sigma_s/\sigma_r$=510/77.4/37.7. In water tests degradation was about 2.5% in 1000 hours compared with 15% in only 72 hours for control oxide. Part of the product was heat-treated for 19 hours at 328° C. in flowing oxygen and used in preparing tape with PMVP as dispersant. The tape had a $t_{10}$ of 24 days. A control using untreated oxide had a $t_{10}$ of 12 days.

EXAMPLE 18

A mixture of 80 g. of Oxide H, 160 g. of 20–30 mesh sand and 300 cc. of water containing 1.0 g. of $SnCl_2 \cdot 2H_2O$ and 0.5 cc. of concentrated hydrochloric acid were shaken for 1 hour on a paint mixer. A solution of 3.0 g. of $Al(NO_3)_3 \cdot 9H_2O$ in 200 cc. of water was then added, and the mixture was shaken for 0.5 hour and stored overnight. The mixture was reshaken and filtered free of sand, and the dispersed oxide was transferred to a reactor with 600 cc. of water and heated to 60° C. with stirring. The pH was 2.20. Further addition of aqueous aluminum nitrate [8.35 g. of $Al(NO_3)_3 \cdot 9H_2O$ in 75 cc. of water ] was begun, and after 6 cc. had been added simultaneous addition of aqueous sodium phosphate (22.6 g. of $Na_3PO_4 \cdot 12H_2O$ in 112 cc. of water was started at the rate of about 0.6 cc./min. pH was controlled at 2.35–2.45 by adding dilute aqueous nitric acid. After 67 cc. of the aluminum nitrate solution had been added, addition of aluminum nitrate and nitric acid was stopped and pH was allowed to rise to 6.00 at which time 105 cc. of the sodium phosphate solution had been used.

The washed and dried oxide contained 0.78% Al, 2.84% $PO_4$, and 0.58 Sn. The surface area of 22.5 m.²/g. was identical to that of the starting material. In the water test about 3% degradation occurred in 1000 hours compared with 15% in 72 hours for the control. The magnetic properties were $iHc/\sigma_s/\sigma_r$=515/76.4/37.4. Part of the material was upgraded by treatment for 19 hours at 328° C. in oxygen and formed into tapes using Alcolec® and PMVP as dispersants. The Alcolec®-containing tape had a $t_{10}$ of 3.6 days while the PMVP-based tape had a $t_{10}$ of 26 days. The controls were 1.6 and 12.5 days respectively. The heat-treated oxide had magnetic properties of $$iHc/\sigma_s/\sigma_r=485/79.0/39.1$$

That the excellent magnetic properties of ferro-magnetic chromium oxide persist through the coating operation is shown by the following data obtained on the tapes described immediately above. The Alcolec®-containing tape will be referred to below as Tape A and the PMPV-containing tape as Tape B. Untreated control oxide in Alcolec®-containing tape will be called Tape $A_{con}$. Measurements on these tapes are shown in Table III.

TABLE III

| Property | Tape A | Tape B | Tape $A_{con}$ |
|---|---|---|---|
| iHc (AC field) | 465 | 465 | 495 |
| $B_r/B_s$ | 0.89 | 0.89 | 0.87 |
| $P/W$ | 29 | 30 | 23 |
| Talysurf | 1.0 | 1.0 | 1.4 |
| Output (30 kc.), db | +3 | +1 | 0 |

"iHc" is the intrinsic coercive force in oersteds.

"$B_r/B_s$" is the fraction of magnetic flux density remaining after applying a 4400-gauss field and then reducing the field to zero.

"$P/W$" is a "peak-to-waist" ratio and indicates magnetic loop squareness. A ratio above 20 is a reasonable value. Higher numbers are indicative of improved suitability for use in magnetic tape applications. The $P/W$ ratio is measured on the first time derivative of a hysteresis loop curve generated by a 60 cps. alternating electric field. The derivative curve is available as an oscilloscope display on a standard commercial B&H meter (e.g., Scientific Atlanta, Model 651B). The $P/W$ value is the ratio of the peak amplitude of the derivative curve to the waist amplitude at zero field in the derivative curve.

"Talysurf" is a tape surface smoothness measured on a Taylor-Hobson "Talysurf" instrument and is the deviation in microinches from a center line average over a range of 0.01 inch.

The "Output" of a tape can be measured in decibels on a loop transport (e.g., Ampex F–44). The data shown were obtained at 30 kc. frequency without bias and are recorded on a relative basis using Tape $A_{con}$ as 0. A plus number signifies a higher output than the reference.

From the data it will be noted that the above tapes prepared from coated oxide had essentially the same coercivities and $B_r/B_s$ fraction as the control tape but superior $P/W$, output and surface smoothness.

EXAMPLE 19

In this experiment the same general procedure of Example 7 was employed. A 50 g. quantity of Oxide D, 128 g. of 20–30 mesh sand, 150 cc. of water and 5.0 g. of 85% phosphoric acid in 100 cc. of water were shaken for 1 hour on a paint mixer after which the slurry was diluted with 100 cc. of water and shaken for an additional 0.5 hour. After standing overnight at about 4° C., the slurry was briefly shaken to redisperse it, separated from the sand by filtering through a 200 mesh screen, and transferred to a water-jacketed reactor with 200 cc. of water. The slurry was stirred and heated to 60° C. at which time the pH was 2.00. A solution of 6.0 g. of commercial sodium aluminate in 200 cc. of water was added at the rate of about 0.6 cc./min. When the pH reached 6.0 (87 cc. of solution in about 2.5 hours) addition was stopped, and the treated oxide was isolated, washed and dried. The product weighed 53.0 g. Analyses showed the presence of 1.07% aluminum and 4.02% phosphate. Electron photomicrographs showed aluminum phosphate adhering to the ferromagnetic chromium oxide. In the water test there was no observable reaction in 1000 hours in contrast to the untreated oxide which underwent 7–10% reaction in the same length of time. Magnetic properties of the treated oxide were $iHc/\sigma_r/\sigma_s$=35/84.6/4.6.

EXAMPLE 20

Oxide B (105.7 g., about 50 g. of ferromagnetic chromium oxide) was placed in a water-jacketed "Osterizer," water (200 cc.) was added and stirring was started. A solution of 20.89 g. of 85% phosphoric acid in 100 cc. of water was then added and the mixture was heated to 65–70° C. To this mixture was added dropwise in 1.5 hours 84 cc. of a solution prepared by mixing a solution of 1.373 g. of lead oxide and 7.15 g. of sodium hydroxide in 25 cc. of water with a solution of 7.38 g. of commercial sodium aluminate in 75 cc. of water. The pH rose to 6.00.

The product was separated by filtration and washed and dried as previously described. It weighed 58 g. Analysis showed 1.87% Al, 1.34% Pb, and 8.29% $PO_4$. Surface area was 19.9 m.²/g. compared with 17.6 m.²/g. for the untreated oxide. Magnetic properties were $iHc/\sigma_s/\sigma_r$= 435/71.5/32.4. In the water test the material reacted about 0.8% in 450 hours as compared to about 11.3% in 168 hours for the untreated oxide.

A portion of the lead and aluminum phosphate coated oxide was incorporated in tape using Alcolec® dispersant. The $T_{10}$ was 4.3 days as compared to a $t_{10}$ of 1.5 days for the uncoated oxide.

EXAMPLE 21

The procedure of this experiment was essentially that of Example 20. Oxide B (105.7 g., i.e., about 50 g. of ferromagnetic chromium oxide) and 250 cc. of water were stirred in a water-jacketed "Osterizer." The slurry was heated to about 70° C. after 6.19 g. of 85% phosphoric acid had been added. A solution of 13.05 g. of zirconyl chloride, $ZrOCl_2 \cdot 8H_2O$, in 117 cc. of aqueous solution was then added over a period of about 2 hours. The slurry was filtered and the zirconium phosphate coated chromium oxide was washed and dried as in previous examples. The mother liquor had a pH of 1.28 and tested strongly for $Cl^-$ but gave no test for $PO_4^{3-}$ or $Zr^{4+}$.

Analysis of the treated ferromagnetic chromium oxide showed 7.9% $PO_4$ and 9.4% Zr. Magnetic properties were $iHc/\sigma_s/\sigma_r$=435/69.8/32.0. Part of this material was heat-treated in oxygen for 6 hours at 350° C. resulting in magnetic properties of 417/70.9/32.8. A tape of the "upgraded" oxide with Alcolec® as dispersant had a $t_{10}$ of 3.4 days compared with a $t_{10}$ of 1.5 days for a control containing uncoated oxide.

EXAMPLE 22

Oxide E (260 g., i.e., about 115 g. of ferromagnetic chromium oxide) was placed in a 32 oz. jar with 445 g. of 20–30 mesh Ottawa sand and a solution of 3.5 g. of $SnCl_2 \cdot 2H_2O$ and 0.4 cc. of commercial concentrated hydrochloric acid in 150 cc. of water. After shaking for 1 hour on a paint mixer, 4.0 g. $SnCl_4 \cdot 5H_2O$ in 30 cc. of water was added, and the shaking was continued for 0.5 hour. The mixture was stored overnight at about 4° C. In the morning, 18.7 g. of $Al(NO_3)_3 \cdot 9H_2O$ dissolved in 200 cc. of water was added and the mixture was again slurried for 0.5 hour on the paint mixer. Sand was separated by filtering through nylon felt, and the ferromagnetic chromium oxide slurry was transferred to a water-jacketed reactor with about 200 cc. of water.

Stirring was begun and the mixture was heated to 60° C. The pH was 1.31. A solution of 12.0 g. of $Na_2HPO_4 \cdot 7H_2O$ in about 100 cc. of water was added over a 2 hour period resulting in a pH of 1.67. The pH was then gradually raised to 5.0, first by slowly adding 250 cc. of 0.1 molar sodium hydroxide and then by slowly adding 100 cc. of 1 molar sodium hydroxide. The product, isolated in the manner described previously, weighed 119 g.

Analyses showed 1.00% Al, 3.48% $PO_4$ ($Al/PO_4$ mole ratio=1.01), and 2.19% Sn. Magnetic properties were $iHC/\sigma_s/\sigma_r$=395/73.0/32.8. The water test showed 1.7% degradation in 1000 hours (untreated material degraded 15% in 330 hours). A portion of the product was heat-treated in a stream of oxygen for about 20 hours at 328° C. and this material had magnetic properties of $iHc/\sigma_s/\sigma_r$=375/76.4/33.9. Magnetic tape made from the heat-treated, aluminum phosphate-coated ferromagnetic chromium oxide using PMVP as dispersant had a $t_{10}$ of 39 days. Untreated oxide dispersed in the tape formulation with Alcolec® had a $t_{10}$ of 1.5 days.

The embodiments of the invention in which an exclusive property or privilege is claimed are defined as follows:

1. A composition of matter consisting essentially of ferromagnetic chromium oxide particles stabilized against loss of magnetic properties by a coating consisting essentially of at least one inorganic metal phosphate selected from the group consisting of trivalent aluminum phosphate, tetravelent zirconium phosphate, tetravalent titanium phosphate, and divalent lead phosphate, said coating being present in an amount of about 1%–20% by weight of said ferromagnetic chromium oxide.

2. The coated ferromagnetic chromium oxide of claim 1 wherein said ferromagnetic chromium oxide is characterized by an intrinsic coercive force above 200 oersteds, a saturation induction in the range of 80–100 gauss-cm.³/g. and a remanence ratio of at least 0.35, said ferromagnetic chromium oxide being in the form of highly uniform, fine, acicular particles of a tetragonal crystal structure of the rutile type ranging up to 1.5 microns in length, and having a median axial ratio ranging from 2:1 to 20:1, essentially all of said particles constituting single magnetic domains.

3. The coated ferromagnetic chromium oxide of claim 2 wherein said metal phosphate coating is aluminum orthophosphate.

4. The coated ferromagnetic chromium oxide of claim 2 wherein said metal phosphate coating is aluminum orthophosphate and lead orthophosphate.

5. The coated ferromagnetic chromium oxide of claim 2 wherein said metal phosphate coating is zirconium orthophosphate.

6. A magnetic recording member, the magnetizable component of which is the coated ferromagnetic chromium oxide of claim 2.

7. A process for the preparation of metal phosphate coated ferromagnetic chromium oxide consisting essentially of:

(1) slurrying ferromagnetic chromium oxide particles in water, (2) precipitating the metal phosphate by adding at about 0° C.–100° C. under agitation, (A) at least one reactant selected from the group consisting of soluble phosphate salts, and soluble acids of pentavalent phosphorus, and (B) at least one reactant selected from the group consisting of soluble trivalent aluminum, tetravalent zirconium, tetravalent titanium and divalent lead salts, metal aluminates and metal plumbites, and (3) controlling the pH of the slurry during the precipitation between about 2.2 and 6.0.

8. The process of claim 7 wherein a portion of at least one reactant of component (A) is added during slurrying of the ferromagnetic chromium oxide particles.

9. The process of claim 7 wherein a portion of at least one reactant of component (B) is added during slurrying of the ferromagnetic chromium oxide particles.

10. The process of claim 7 wherein components (A) and (B) are added simultaneously.

11. The process of claim 7 wherein the pH of the slurry is maintained between about 2.3–2.6 until at least the first 10%–20% of the precipitation is completed.

12. The process of claim 7 wherein the metal phosphate is precipitated at about 40° C.–60° C.

13. The process of claim 7 wherein the metal phosphate coated ferromagnetic chromium oxide product is isolated, and dried at about 0° C. to 150° C.

14. The process of claim 13 wherein the dry product is heated in an oxygen containing atmosphere at about 150° C.–425° C.

15. The process of claim 14 wherein the dry product is heated in an oxygen containing atmosphere at about 250° C.–400° C.

16. The process of claim 7 wherein the metal phosphate coated ferromagnetic chromium oxide product is isolated, and heated in an oxygen containing atmosphere at about 150° C.–425° C.

17. The process of claim 16 wherein the isolated product is headed in an oxygen containing atmosphere at about 250° C.–400° C.

18. The process of claim 7 wherein component (A) is a water-soluble orthophosphate salt.

19. The process of claim 7 wherein component (A) is $(NH_4)_2HPO_4$, component (B) is $AlCl_3 \cdot 6H_2O$ and component (A) is added first.

20. The process of claim 7 wherein component (A) is $(NH_4)_2HPO_4$, component (B) is $AlCl_3 \cdot 6H_2O$ and component (B) is added first.

21. The process of claim 7 wherein component (A) is $(NH_4)_2HPO_4$, component (B) is $Al(NO_3) \cdot 9H_2O$, and component (A) is added first.

22. The process of claim 7 wherein component (A) is orthophosphoric acid, component (B) is sodium aluminate, and component (A) is added first.

23. The process of claim 7 wherein component (A) is orthophosphoric acid, component (B) is a solution of sodium plumbite and sodium aluminate, and component (A) is added first.

24. The process of claim 7 wherein component (A) is orthophosphoric acid, component (B) is $ZrOCl_2 \cdot 8H_2O$, and component (A) is added first.

25. The process of claim 10 wherein component (A) is $(NH_4)_2HPO_4$ and component (B) is $Al(NO_3)_3 \cdot 9H_2O$.

26. The process of claim 10 wherein component (A) is orthophosphoric acid and component (B) is sodium aluminate.

References Cited

UNITED STATES PATENTS

| | | | |
|---|---|---|---|
| 2,601,212 | 6/1952 | Polydoroff | 148—6.15 Z |
| 3,278,263 | 10/1966 | Cox | 23—145 |
| 3,003,965 | 10/1961 | Troelstra et al. | 252—62.51 |

FOREIGN PATENTS

| | | | |
|---|---|---|---|
| 859,937 | 1/1921 | Great Britain | 252—62.51 |

OSCAR R. VERTIZ, Primary Examiner

H. S. MILLER, Assistant Examiner

U.S. Cl. X.R.

23—145; 148—6.15 R; 252—62.51